J. J. COLLINGBOURNE.
Hand-Trucks.
No. 135,889. Patented Feb. 18, 1873.
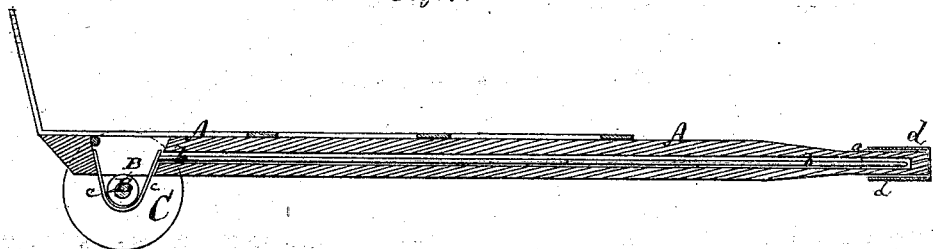
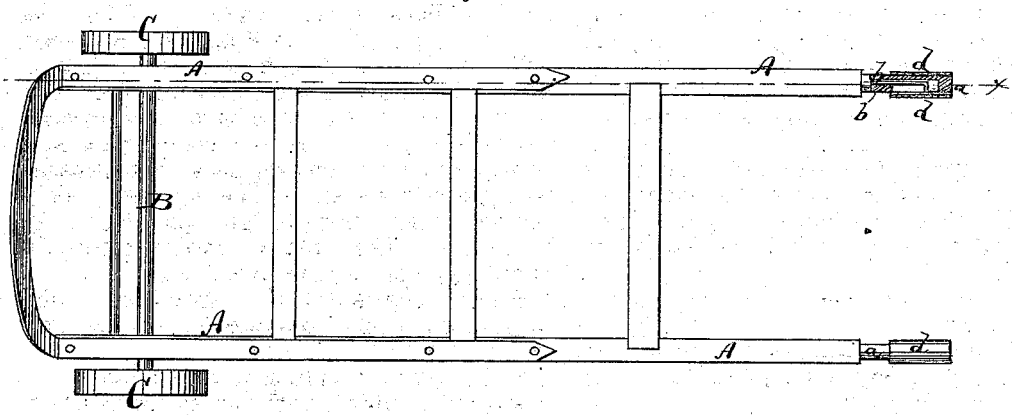

UNITED STATES PATENT OFFICE.

JAMES J. COLLINGBOURNE, OF NEW YORK, N. Y.

IMPROVEMENT IN HAND-TRUCKS.

Specification forming part of Letters Patent No. 135,889, dated February 18, 1873.

*To all whom it may concern:*

Be it known that I, JAMES JASPER COLLINGBOURNE, of the city of New York, in the county and State of New York, have invented a new and Improved Hand-Truck; and I do hereby declare that the following is a full, clear, and exact description thereof, which will enable others skilled in the art to make and use the same, reference being had to the accompanying drawing forming part of this specification.

Figure 1 represents a longitudinal section of my improved hand-truck, the plane of section being indicated by the line $xx$, Fig. 2. Fig. 2 is a plan or top view, partly in section, of the same.

Similar letters of reference indicate corresponding parts.

My invention relates to hand-trucks; and my object is to introduce thereon an improved brake device, which will be first described in connection with all that is necessary to a full understanding thereof, and then clearly pointed out in the claim.

A A in the drawing are the side bars of a truck. B is the axle, and C C are the wheels, of a hand-truck of ordinary or suitable construction. At the ends of the side bars A A are formed the handles $a$ of suitable construction. The side bars are either made tubular or are grooved on the sides or bottom to receive sliding bars $b\ b$ which extend from the handles to near the axle B. The lower ends of the bars $b$ are connected with spring-brakes $c\ c$ of suitable construction, the said brakes being fitted over and around the axle B, or around the hubs of the wheels C. The upper or outer end of each bar $b$ is connected with a sleeve, $d$, that slides on the handle $a$. When the sleeve $d$ is pushed toward the axle B the rod will be pushed by it so as to apply the brake. Thus, when a person is drawing a loaded truck down an incline, and the same is apt to descend too rapidly, or to bear too heavily against a person, the latter, holding back on the sleeves will, by the mere act of holding back, apply the brakes and prevent the rapid descent of the truck. The greatest inconvenience in handling trucks is thus overcome.

Having thus described my invention, I claim as new and desire to secure by Letters Patent—

1. The rods $b\ b$ sliding in the side bars A A of a truck, combined with and attached directly to axle-brakes C C, as described.

2. Sleeves $d\ d$ sliding on the handles, combined with rods $b\ b$ sliding in the side bars, as described.

3. The sleeves sliding on the handles, the rods $b\ b$ sliding in the side bars, and the spring axle-brakes C C, all combined, located, and operated together, as described.

JAMES J. COLLINGBOURNE.

Witnesses:
GEO. W. MABEE,
T. B. MOSHER.